United States Patent
Chen

(10) Patent No.: US 7,182,261 B2
(45) Date of Patent: Feb. 27, 2007

(54) VOICE RECORDING AND PLAYBACK APPARATUS WITH RANDOM AND SEQUENTIAL ADDRESSING

(76) Inventor: Chiou-Min Chen, No. 27, Sec. 1, Huayuan 7th Rd., Sindian City, Taipei County 231 (TW)

( * ) Notice: Subject to any disclaimer, the term of this patent is extended or adjusted under 35 U.S.C. 154(b) by 252 days.

(21) Appl. No.: 10/831,133

(22) Filed: Apr. 26, 2004

(65) Prior Publication Data

US 2005/0236469 A1    Oct. 27, 2005

(51) Int. Cl.
*G06K 15/00*    (2006.01)
(52) U.S. Cl. .................... 235/462.13; 235/472.01; 235/472.02
(58) Field of Classification Search ........... 235/462.13, 235/462.45, 472.01, 472.02, 472.03; 379/88.14, 379/88.13, 910
See application file for complete search history.

(56) References Cited

U.S. PATENT DOCUMENTS

| | | | |
|---|---|---|---|
| 5,852,803 A | * | 12/1998 | Ashby et al. ............... 704/270 |
| 6,873,687 B2 | * | 3/2005 | Smith, II ................ 379/88.14 |
| RE38,965 E | * | 1/2006 | Ashby et al. .............. 704/270 |
| 2003/0048882 A1 | * | 3/2003 | Smith, II ................ 379/88.14 |
| 2003/0220835 A1 | * | 11/2003 | Barnes ...................... 705/14 |

* cited by examiner

*Primary Examiner*—Karl D. Frech
(74) *Attorney, Agent, or Firm*—Troxell Law Office, PLLC

(57) ABSTRACT

Present invention is a voice recording and playback apparatus with random and sequential addressing, comprising: a processor for all information operation of the apparatus; a record/playback unit for receiving outside sounds and replaying the sounds; a storage unit for storing the outside sound data received by the record/playback unit; an output unit for assigning the outside sound data with a serial number (S/N) and outputting into an S/N bar code; a sensor for sensing the S/N bar code or a Radio Frequency Identification (RFID) and picking up the sound data for the S/N or RFID and replaying the sound data by the record/playback unit; and a power supplier for the apparatus. Accordingly, after the sensor senses the S/N bar code or the RFID, the sound data for the S/N or RFID can be found in a random addressing style to rapidly find the sound data stored in the storage unit.

27 Claims, 4 Drawing Sheets

VOICE RECORDING AND PLAYBACK APPARATUS WITH RANDOM AND SEQUENTIAL ADDRESSING

FIELD OF THE INVENTION

Present invention relates to a voice recording and playback apparatus with random and sequential addressing; more particularly, relates to a voice recording and playback apparatus with random and sequential addressing that can rapidly find the sound data in the storage unit in a random addressing style.

DESCRIPTION OF THE RELATED ART

As is known, the voice recording and playback apparatus of the related art can simply record sound data and replay it. General users of such apparatus usually record sound data along with written notes for later use of the sound data as well as the notes. Although such apparatus of the related art can record the sound data into segments, if the sound data stored in the apparatus is too much or the related notes is too complex, the user will not be able to find rapidly and exactly the stored data required and so it is not convenient on usage. Accordingly, general apparatus of the related art does not fulfill users' requests.

BRIEF SUMMARY OF THE INVENTION

Therefore, the main purpose of the present invention is that, after the sensor has sensed a serial number (S/N) bar code or an RFID, the sound data for the S/N or RFID is searched and found in a random addressing style and is replayed, which means that the sound data stored in the storage unit can be found rapidly.

To achieve the above purpose, the present invention is a voice recording and playback apparatus with random and sequential addressing, which comprises: a processor for all information operation of the apparatus; a record/playback unit for receiving outside sound data and replaying it; a storage unit for storing the outside sound information received by the record/playback unit and for sending stored outside sound data to be replayed by said record/playback unit under the control of said processor; an output unit, connected to the storage unit, for assigning the outside sound data with a serial number (S/N) and outputted to an S/N bar code and storing the S/N together with the sound data in the storage unit; a sensor, connected to the processor, for sensing the S/N or RFID as a search criterion to compare with sound data stored in the storage unit and pick up the corresponding sound data to be replayed by the record/playback unit; and a power supplier, connected to the processor, to provide power required for processing the sound data. Accordingly, after the sensor senses the serial number bar code or RFID, the sound information for the serial number can be found in a random addressing style to achieve the effect that the sound information in the storage unit can be found rapidly.

BRIEF DESCRIPTION OF THE DRAWINGS

The present invention will be better understood from the following detailed description of a preferred embodiment of the invention, taken in conjunction with the accompanying drawings, in which.

DESCRIPTION OF THE PREFERRED EMBODIMENT

The following descriptions of the preferred embodiment are provided to understand the features and the structures of the present invention.

Figure 1:
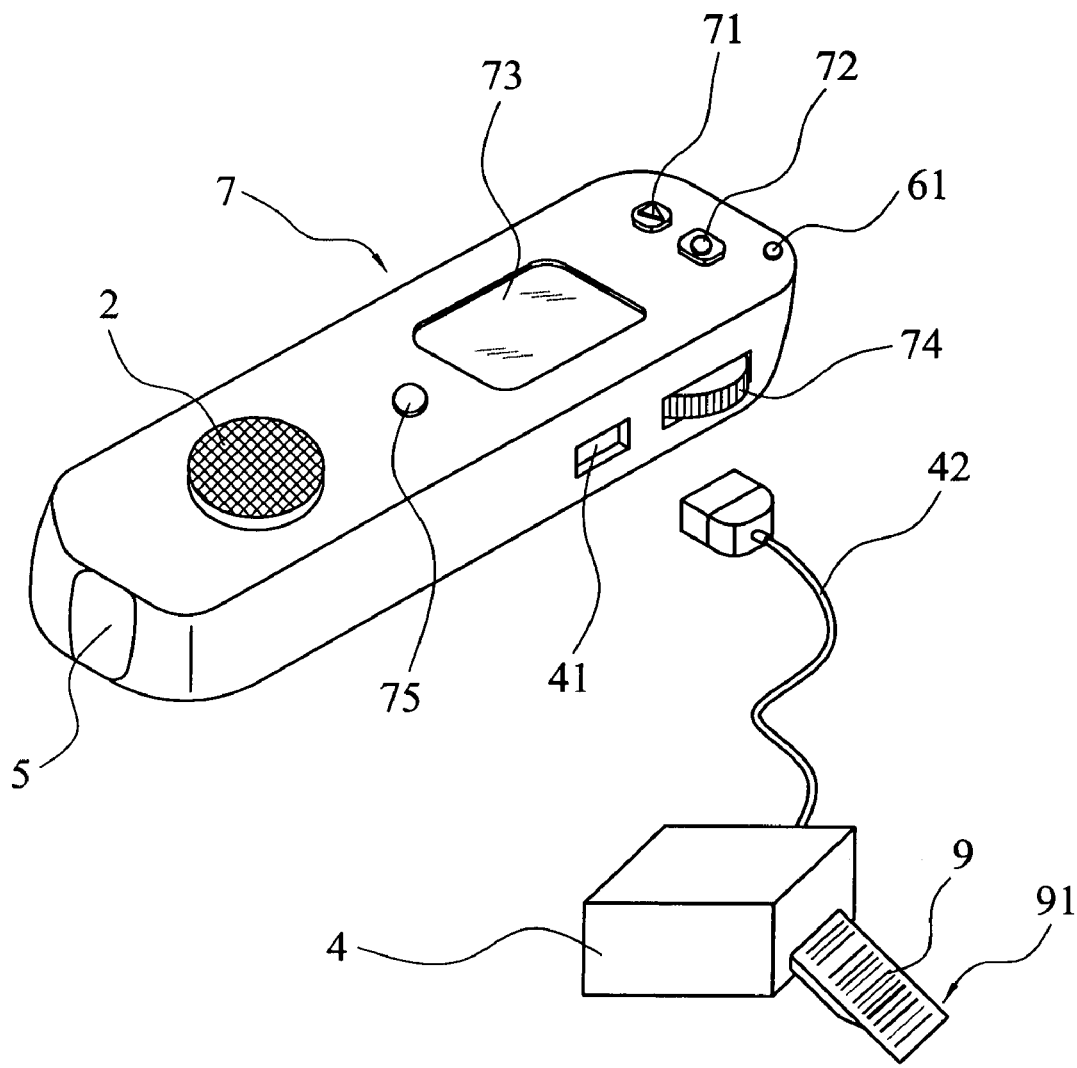
FIG. 1 is a perspective view of the preferred embodiment according to the present invention.
Figure 2:
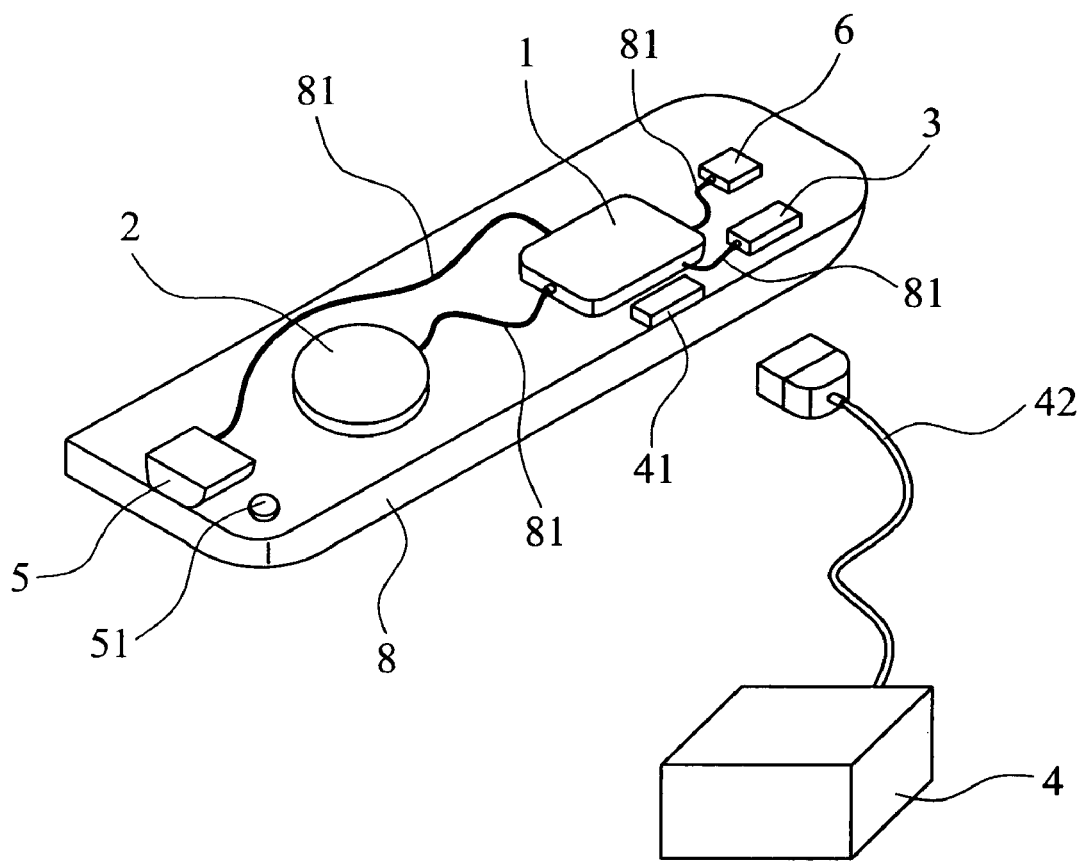
FIG. 2 is an inner disposition view of the preferred embodiment according to the present invention.

Please refer to FIG. 1 and FIG. 2, which are a perspective view and an inner disposition view of the preferred embodiment according to the present invention. As shown in the figures, the present invention is a voice recording and playback apparatus with random and sequential addressing which comprises a processor 1, a record/playback unit 2. a storage unit 3, an output unit 4, a sensor 5 and a power supplier 6. After the sensor 5 senses a serial number (S/N) bar code 9 or RFID and find the corresponding data stored in the storage unit 3, the sound information for the S/N or RFID can be found in a random addressing style to rapidly find the sound information stored in the storage unit 3. The processor 1, the record/playback unit 2, the storage unit 3, the output unit 4, the sensor 5 and the power supplier 6 are all in a shell 7. The processor 1, the record/playback unit 2, the storage unit 3, and the sensor 5 are tied in with a circuit board 8 and they are connected by wire lines 81 on the circuit board 8 that the wire lines 81 are ports for transmission in between. The apparatus further comprises a playback switch 71 in the shell 7 to turn playback function on or off; a record switch 72 in the shell 7 to turn record function on or off; a display 73 on the shell 7 to show the status of the apparatus; a volume tuner 74 to tune sound volume outputted by the record/playback unit 2; and a function switch bottom 75 to select the function to be processed by the apparatus.

The processor 1 is for all data operation and comprises at least one port.

The record/playback unit 2 is connected to a port of the processor 1 and the record/playback unit 2 can be a receiver for receiving outside sounds and a speaker for replaying the sounds; and the record/playback unit can be a connector to transfer outside sound data to be stored in the storage unit.

The storage unit 3 is connected to the processor 1 and can store the outside sound data received by the record/playback unit 2 and send a stored outside sound data to be replayed by the record/playback unit 2 under the control of the processor 1.

The output unit 4 is connected to a port of the processor 1. The port between the processor 1 and the output unit 4 is a connector 41 and they are connected with each other by the connector 41 together with a transmit line 42. The transmit line 42 is for transferring a serial number (S/N) or an RFID assigned to the outside sound data received by the record/playback unit 2 so that an S/N bar code can be obtained. The S/N (or RFID data) and the sound data are stored together in the storage unit 3, and the output unit 4 can print the S/N bar code 9 on a sticker 91.

The sensor 5 is connected to a port of the processor 1. It senses the S/N bar code 9 or a RFID to get an S/N or a RFID as a search condition to compare with data stored in the storage unit 3 and pick up the corresponding sound data to be replayed by the record/playback unit 2. The sensor 5 comprises at least an auxiliary light 51 to provide light needed on detecting the S/N bar code 9.

The power supplier 6 is connected to the processor 1 to provide power required for processing the sound data; and the power supplier 6 further comprises a power switch bottom 61 on the shell 7 to switch power on or off.

Accordingly, a novel voice recording and playback apparatus with random and sequential addressing is constructed according to the above structure.

Figure 3:
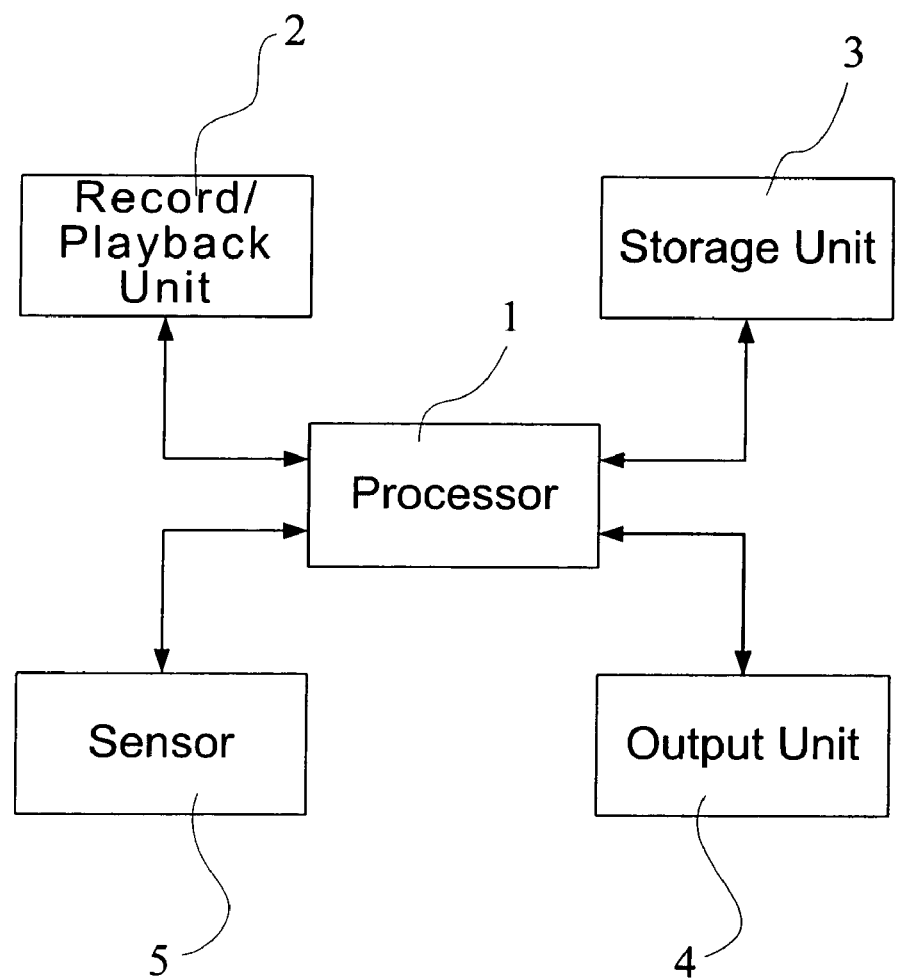
FIG. 3 is a diagram of the preferred embodiment according to the present invention.
Figure 4:
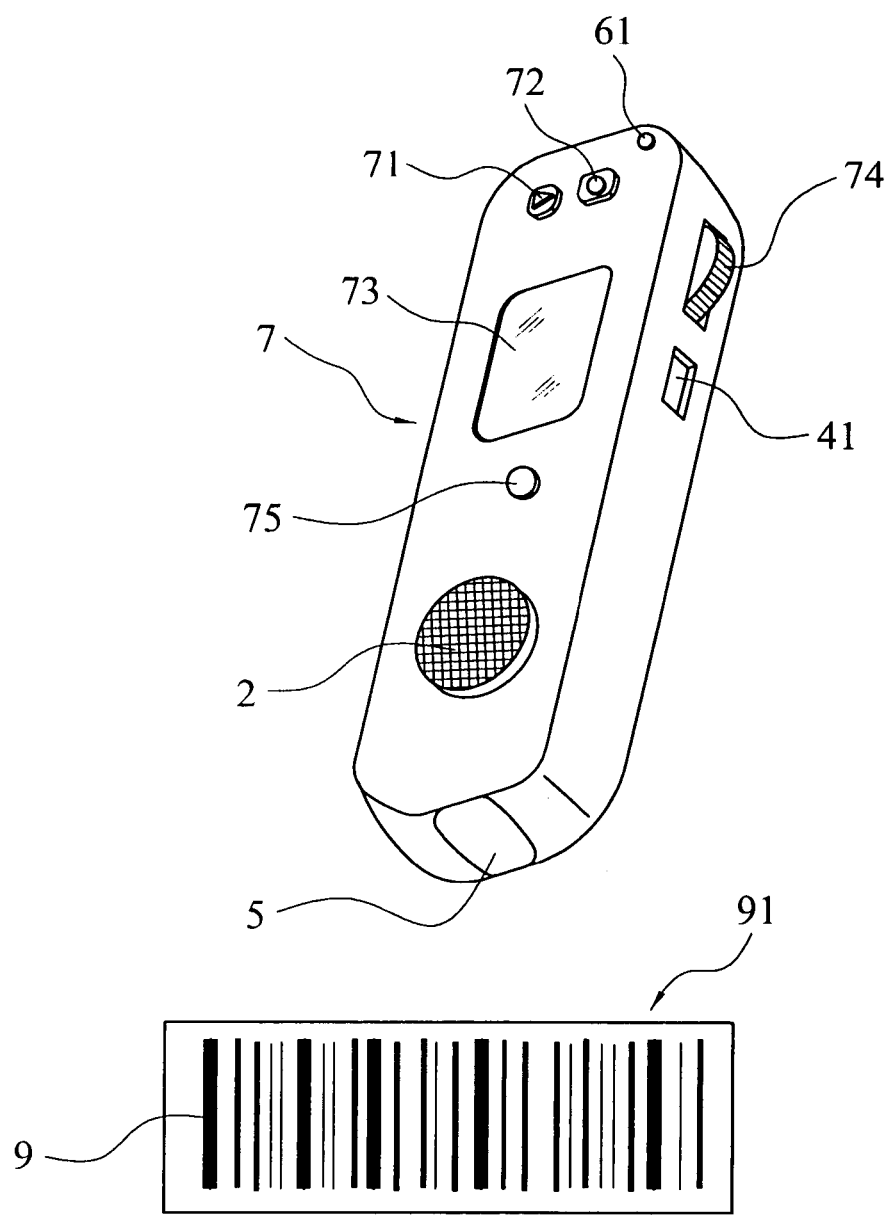
FIG. 4 is a perspective view of the preferred embodiment showing the status of use according to the present invention.

Please refer to FIG. 3 and FIG. 4, which are a diagram of the preferred embodiment and a perspective view of the preferred embodiment showing the status of use, according to the present invention. As shown in the figures, the user only needs to press on the power switch bottom 61 to turn on the power supplier 6 to use it; and, the record switch 72 is turned on so that the record/playback unit 2 is in recording status; and then, the record/playback unit will receive outside sound data and the sound data is stored in the storage unit; and, if the user wants to replay the sound data, he can press the playback switch 71 to make the sound data under the control of the processor 1 to be replayed by the record/playback unit 2.

If the user wants to print an S/N bar code 9 for the sound data, he can use the function switch bottom 75 to choose to have the output unit 4 assign the outside sound data with an S/N and output a bar code 9 for the S/N by the output unit 4; and, when the S/N bar code 9 is outputted, the S/N and the sound data is simultaneously stored in the storage unit 3; and the S/N bar code 9 is printed out on a sticker 91. At that time, the user can stick the sticker on a note and file it. If later one day the user wants to replay that sound data, he can use the sensor 5 to sense the S/N bar code or an RFID to get the S/N or RFID as a search criterion to compare with sound data stored in the storage unit 3 and pick up the sound data in the storage unit 3 to be replayed by the record/playback unit. Accordingly, after the sensor senses the serial number bar code 9 or the RFID, the sound information for the S/N or RFID can be found in a random addressing style to find rapidly the sound information in the storage unit 3.

Or, taken as an example, in an art museum, the provenance or the history of a painting or an article is narrated by a playback device. At the time being, the user can connect the connector of the record/playback unit 2 to the playback device of the painting or the article to receive the outside sound data and transfer the sound data to the storage unit 3 through the connector so that the outside sound data can be assigned with an S/N or a corresponding data for RFID and an S/N bar code 9 can be outputted by the output unit 4. When the S/N bar code 9 is outputted by the output unit 4, the S/N and the sound data is simultaneously stored in the storage unit 3 and the S/N bar code is printed out on a sticker 91. Accordingly, when in a reading status, the S/N bar code 9 is sensed by the sensor 5 to get an S/N or data for an RFID as a search criterion to compare with sound data previously stored in the storage unit 6 and pick up the corresponding sound data to be replayed by the record/playback unit 2.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. A voice recording and playback apparatus with random and sequential addressing, comprising:
    a processor for all data operation;
    a record/playback unit, connected to said processor, for receiving outside sounds and replaying said sounds;
    a storage unit, connected to said record/playback unit, for storing outside sound data received by record/playback unit and for sending a stored outside sound data to be replayed by said record/playback unit under the control of said processor;
    an output unit, connected to said storage unit, for outputting a bar code of the serial number (S/N) assigned to said outside sound data and for storing said S/N together with said sound data in said storage unit, said serial number serving to index a location of said sound data in said storage unit;
    a sensor, connected to said processor, for sensing said S/N as a search criterion to locate the sound data stored in said storage unit and identify corresponding sound data to be replayed by said record/playback unit; and
    a power supplier, connected to said processor, for providing power required when processing said sound data, wherein said apparatus is configured to be capable of locating said S/N using a random addressing style search.

2. The voice recording and playback apparatus according to claim 1,
    wherein said processor, said record/playback unit, said storage unit, said output unit and said sensor are tied in with a circuit board and are inter connected on said circuit board by wire lines that are ports for doing transmission in between, and
    wherein said output unit is connected to said circuit board with a connector that is connected to said processor with a transmission line.

3. The voice recording and playback apparatus according to claim 1, further comprising
    a power switch bottom to switch power on or off.

4. The voice recording and playback apparatus according to claim 1, further comprising
    a playback switch to turn playback function on or off.

5. The voice recording and playback apparatus according to claim 1, further comprising
    a record switch to turn record function on or off.

6. The voice recording and playback apparatus according to claim 1, further comprising
    a display to show the status of said apparatus.

7. The voice recording and playback apparatus according to claim 1, further comprising
    a volume tuner to tune sound volume outputted by said record/playback unit.

8. The voice recording and playback apparatus according to claim 1, further comprising
    a function switch bottom to select the function to be operated by said apparatus.

9. The voice recording and playback apparatus according to claim 1,
    wherein said record/playback unit is a speaker.

10. The voice recording and playback apparatus according to claim 1,
    wherein said record/playback unit is a connector for transferring outside sound data to said storage unit to be stored.

11. The voice recording and playback apparatus according to claim 1,
    wherein said output unit is for printing S/N bar code on a sticker.

12. The voice recording and playback apparatus according to claim 1, wherein said sensor at least comprises an auxiliary light for providing light needed when detecting said S/N bar code.

13. The voice recording and playback apparatus according to claim 1,
wherein said sensor is to detect an Radio Frequency Identification (RFID).

14. A voice recording and playback apparatus with random and sequential addressing, comprising:
a shell;
a processor in said shell for all data operation, comprising at least one port;
a record/playback unit in said shell, connected to a port of said processor, for receiving outside sounds and replaying said sounds;
a storage unit in said shell, connected to said processor, for storing outside sound data received by said record/playback unit and, under the control of said processor, sending stored outside sound data to be replayed by said record/playback unit;
an output unit, connected to a port of said processor, for outputting the bar code of a serial number (S/N) assigned to said outside sound data to indicate the location of said outside sound data on said storage unit and storing said S/N together with said sound data in said storage unit;
a sensor in said shell, connected to a port of said processor, for sensing said S/N as a search criterion to compare with sound data stored in said storage unit and pick up corresponding sound data to be replayed by said record/playback unit; and
a power supplier in said shell, connected to said processor, for providing power required when processing said sound data, wherein said apparatus is configured to be capable of locating said S/N using a random addressing style search.

15. The voice recording and playback apparatus according to claim 14,
wherein said processor, said record/playback unit, said storage unit and said sensor are tied in with a circuit board and are inter connected on said circuit board by wire lines that are ports for doing transmission in between.

16. The voice recording and playback apparatus according to claim 14,
wherein said output unit is connected to said circuit board with a connector that is connected to said processor with a transmission line.

17. The voice recording and playback apparatus according to claim 14, further comprising
a power switch bottom on said shell to switch power on or off.

18. The voice recording and playback apparatus according to claim 14, further comprising
a playback switch in said shell to turn playback function on or off.

19. The voice recording and playback apparatus according to claim 14, further comprising
a record switch in said shell to turn record function on or off.

20. The voice recording and playback apparatus according to claim 14, further comprising
a display on said shell to show the status of said apparatus.

21. The voice recording and playback apparatus according to claim 14, further comprising
a volume tuner to tune sound volume outputted by said record/playback unit.

22. The voice recording and playback apparatus according to claim 14, further comprising
a function switch bottom to select the function to be processed by said apparatus.

23. The voice recording and playback apparatus according to claim 14,
wherein said record/playback unit is a speaker.

24. The voice recording and playback apparatus according to claim 14,
wherein said record/playback unit is a connector for transferring outside sound data to be stored in said storage unit.

25. The voice recording and playback apparatus according to claim 14,
wherein said output unit is for printing S/N bar code on a sticker.

26. The voice recording and playback apparatus according to claim 14,
wherein said sensor comprises at least an auxiliary light for providing light needed on detecting said S/N bar code.

27. The voice recording and playback apparatus according to claim 14,
wherein said sensor is to detect an Radio Frequency Identification (REID).

* * * * *